(12) United States Patent
Takahashi

(10) Patent No.: US 10,831,148 B1
(45) Date of Patent: Nov. 10, 2020

(54) BEARING DEVICE THAT SUPPORTS A FIRST ROTATION MEMBER, IMAGE FORMING APPARATUS THAT INCLUDES THE BEARING DEVICE, AND ASSOCIATED METHOD

(71) Applicant: TOSHIBA TEC KABUSHIKI KAISHA, Tokyo (JP)

(72) Inventor: Nobuaki Takahashi, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/572,780

(22) Filed: Sep. 17, 2019

(51) Int. Cl.
*G03G 21/16* (2006.01)
*G03G 15/00* (2006.01)
*F16C 19/06* (2006.01)

(52) U.S. Cl.
CPC ....... *G03G 21/1647* (2013.01); *G03G 15/757* (2013.01); *G03G 21/1671* (2013.01); *F16C 19/06* (2013.01); *F16C 2324/00* (2013.01)

(58) Field of Classification Search
CPC ............. G03G 15/757; G03G 21/1647; G03G 21/1671; F16C 9/06; F16C 2324/00
See application file for complete search history.

(56) References Cited

U.S. PATENT DOCUMENTS

| 8,879,955 B2 | 11/2014 | Wakayama |
| 9,772,597 B2 | 9/2017 | Inada |
| 2019/0033777 A1* | 1/2019 | Narita ............... F16C 17/02 |

FOREIGN PATENT DOCUMENTS

JP      2009-287590      12/2009

* cited by examiner

*Primary Examiner* — Joseph S Wong
(74) *Attorney, Agent, or Firm* — Amin, Turocy & Watson, LLP

(57) ABSTRACT

In accordance with an embodiment, a bearing device comprises a sliding bearing including a main body and a plurality of first protrusions, the plurality of first protrusions protruding inward in a radial direction from the main body and being separated from each other in a circumferential direction; a housing including a holding portion; and a plurality of second protrusions, separated from each other in a circumferential direction, configured to protrude in the radial direction from at least one of an outer circumferential portion of the main body and an inner circumferential portion of the holding portion, and to form a gap extending in the circumferential direction between the main body and the holding portion.

18 Claims, 10 Drawing Sheets

BEARING DEVICE THAT SUPPORTS A FIRST ROTATION MEMBER, IMAGE FORMING APPARATUS THAT INCLUDES THE BEARING DEVICE, AND ASSOCIATED METHOD

FIELD

Embodiments described herein relate generally to a bearing device, an image forming apparatus, and methods related thereto.

BACKGROUND

A sliding bearing may be used in a bearing device that supports a shaft of a photoconductive drum of an image forming apparatus. The sliding bearing is held in a housing for accommodating the photoconductive drum. The sliding bearing is thermally expanded due to frictional heat. A sliding load increases as the sliding bearing deforms due to a difference in thermal expansion coefficient between the sliding bearing and the housing. As a result, there is a possibility that rotation unevenness of the photoconductive drum occurs. There is a possibility that the rotation unevenness of the photoconductive drum leads to degradation of image quality.

DETAILED DESCRIPTION

In accordance with an embodiment, a bearing device used to support a first rotation member having a shaft at an end thereof, comprises a sliding bearing including a main body and a plurality of first protrusions and capable of being fitted to the shaft at an inner side of the plurality of first protrusions, the main body being formed in a cylindrical shape and having an inner diameter larger than an outer diameter of the shaft, and the plurality of first protrusions protruding inward in a radial direction from the main body and being separated from each other in a circumferential direction and capable of sliding against the shaft; a housing including a holding portion for supporting an outer side in the radial direction of the sliding bearing; and a plurality of second protrusions, separated from each other in a circumferential direction, configured to protrude in the radial direction from at least one of an outer circumferential portion of the main body and an inner circumferential portion of the holding portion, and to form a gap extending in the circumferential direction between the main body and the holding portion. In accordance with another embodiment, a method of maintaining substantially even rotation of a photoconductive drum in an image forming apparatus involves supporting a first rotation member having a shaft at an end thereof with the bearing device described above.

First Embodiment

Hereinafter, a bearing device and an image forming apparatus of the first embodiment are described with reference to the accompanying drawings.

Figure 1:
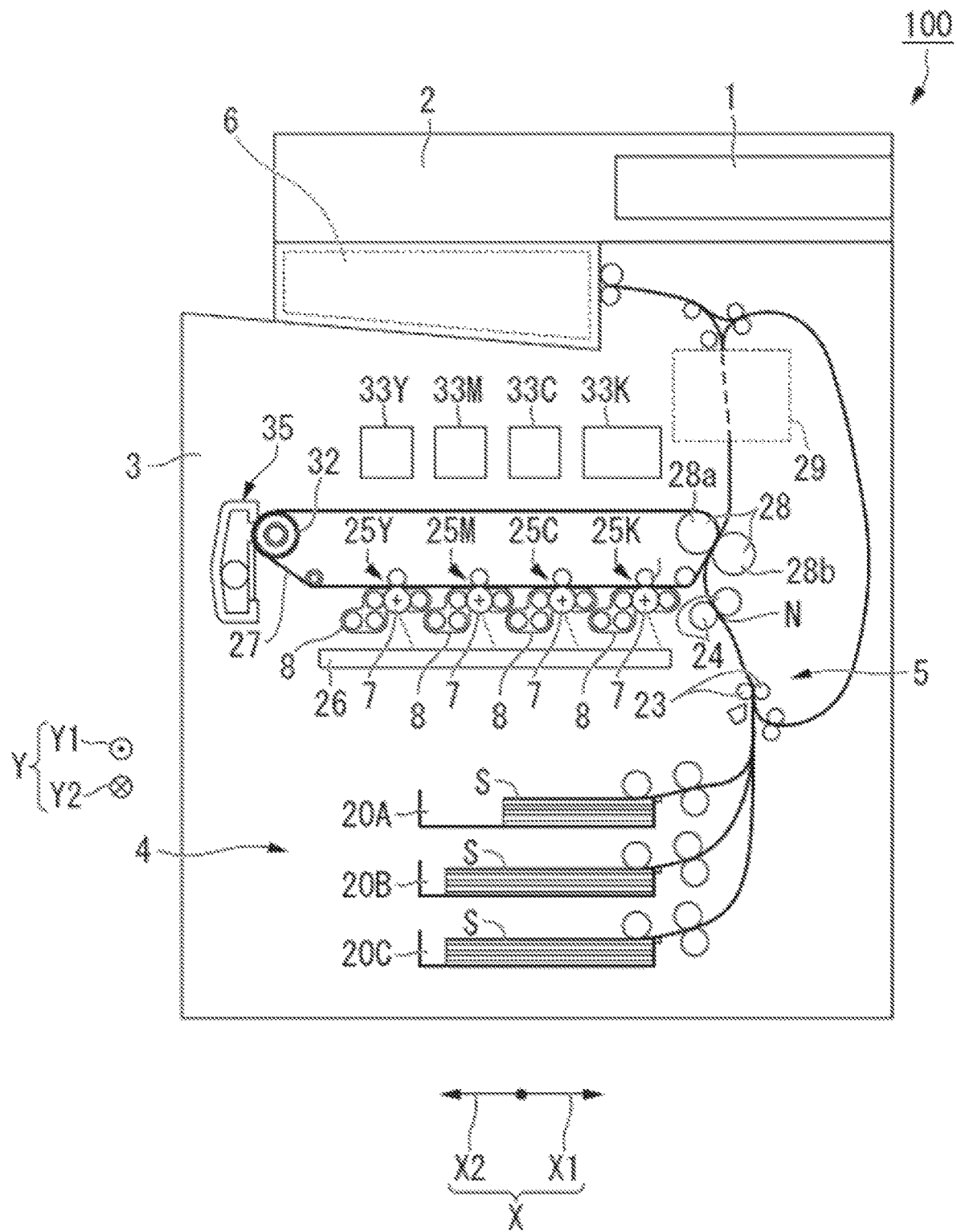
FIG. 1 is a cross-sectional view schematically illustrating an overall configuration of an image forming apparatus according to a first embodiment.

FIG. 1 is a cross-sectional view schematically illustrating an overall configuration of the image forming apparatus according to the embodiment. In the following drawings, the same or corresponding components are denoted with the same reference symbols unless otherwise specified.

As shown in FIG. 1, an image forming apparatus 100 according to the present embodiment includes a control panel 1, a scanner section 2, a printer section 3, a sheet feed section 4, a conveyance section 5 and a main body control section 6.

Hereinafter, when referring to a relative position in the image forming apparatus 100, X1, X2, Y1 and Y2 directions shown in the drawing may be used. The X1 direction is a direction from left to right at the time of standing in front of the image forming apparatus 100 (on the front side of a paper surface of FIG. 1). The X2 direction is opposite to the X1 direction. The Y1 direction is a direction from a back surface to a front surface of the image forming apparatus 100. The Y2 direction is opposite to the Y1 direction. When the directions of the X1 (Y1) direction and the X2 (Y2) direction are not particularly distinguished or when both directions are included, they are simply referred to as an X (Y) direction.

The control panel 1 operates the image forming apparatus 100 in response to an operation performed by an operator.

The scanner section 2 reads image information of an object to be copied as intensity of light. The scanner section 2 outputs the read image information to the printer section 3.

The printer section 3 forms an image on a sheet S based on image information from the scanner section 2 or an external device.

The printer section 3 forms an output image (i.e., a toner image) with a developer containing a toner. The printer section 3 transfers the toner image onto a surface of the sheet S. The printer section 3 applies heat and pressure to the toner image on the surface of the sheet S to fix the toner image to the sheet S.

The sheet feed section 4 feeds sheets S one by one to the printer section 3 in accordance with a timing at which the printer section 3 forms a toner image.

The sheet feed section 4 has a plurality of sheet feed cassettes 20A, 20B and 20C.

The sheet feed section 4 takes out sheets S required for image formation one by one from each of the sheet feed cassettes 20A, 20B and 20C. The sheet feed section 4 conveys the sheet S taken out to the conveyance section 5 directed to the printer section 3.

The conveyance section 5 has a conveyance roller 23 and a registration roller 24. The conveyance section 5 conveys the sheet S fed from the sheet feed section 4 to the registration roller 24. The registration roller 24 conveys the sheet S in accordance with a timing at which the printer section 3 transfers the toner image onto the sheet S.

A tip of the sheet S in a conveyance direction thereof abuts against a nip N of the registration roller 24 in the conveyance roller 23. The conveyance roller 23 aligns a tip position of the sheet S in the conveyance direction thereof by bending the sheet S.

The registration roller 24 aligns, at the nip N, the tip of the sheet S conveyed from the conveyance roller 23. Furthermore, the registration roller 24 conveys the sheet S to a transfer section 28 side described below.

The printer section 3 includes image forming sections 25Y, 25M, 25C and 25K, an exposure section 26, an intermediate transfer belt 27, the transfer section 28, a fixing device 29 and a transfer belt cleaning unit 35.

The image forming sections 25Y, 25M, 25C and 25K are arranged in this order in the X1 direction.

Each of the image forming sections 25Y, 25M, 25C and 25K forms a toner image to be transferred onto the sheet S on the intermediate transfer belt 27.

The image forming sections 25Y, 25M, 25C and 25K each include a photoconductive drum 7 (i.e., a first rotation member). The image forming sections 25Y, 25M, 25C and 25K form yellow, magenta, cyan and black toner images on the photoconductive drums 7 thereof, respectively. A charger, a developing device 8, a primary transfer roller, a cleaning unit and a charge removing device are arranged around each of the photoconductive drums 7, respectively. The primary transfer roller faces the photoconductive drum 7. An intermediate transfer belt 27 is sandwiched between the primary transfer roller and the photoconductive drum 7. Below the charger and the developing device 8, the exposure section 26 is arranged.

Toner cartridges 33Y, 33M, 33C and 33K are arranged above the image forming sections 25Y, 25M, 25C and 25K. The toner cartridges 33Y, 33M, 33C and 33K accommodate yellow toner, magenta toner, cyan toner and black toner, respectively.

The toner in the toner cartridges 33Y, 33M, 33C and 33K is supplied to the image forming sections 25Y, 25M, 25C and 25K through toner replenishment pipes (not shown).

The exposure section 26 irradiates a surface of each charged photoconductive drum 7 with laser beam. The laser beam is controlled to emit light based on the image information. The exposure section 26 may emit LED (Light Emitting Diode) light instead of laser light.

The image information respectively corresponding to yellow, magenta, cyan and black is supplied to the exposure section 26.

The exposure section 26 forms an electrostatic latent image on the surface of each photoconductive drum 7 based on the image information.

The intermediate transfer belt 27 is an endless belt. Tension is applied to the intermediate transfer belt 27 by a plurality of rollers abutting against an inner circumferential surface of the intermediate transfer belt 27. The intermediate transfer belt 27 is stretched flatly. A support roller 28a abuts against the inner circumferential surface of the intermediate transfer belt 27 at a position in the X1 direction that is the most distant in a stretching direction. A transfer belt roller 32 abuts against the inner circumferential surface of the intermediate transfer belt 27 at a position in the X2 direction that is the most distant in the stretching direction.

The support roller 28a forms a part of the transfer section described below. The support roller 28a guides the intermediate transfer belt 27 to a secondary transfer position.

The transfer belt roller 32 guides the intermediate transfer belt 27 to a cleaning position.

Except for the primary transfer roller, the image forming sections 25Y, 25M, 25C and 25K are arranged in this order in the X1 direction on a lower surface side of the intermediate transfer belt 27 shown in FIG. 1. The image forming sections 25Y, 25M, 25C and 25K are arranged at intervals therebetween in an area between the transfer belt roller 32 and the support roller 28a.

When the toner image reaches a primary transfer position, a transfer bias is applied to each of the primary transfer rollers of the image forming sections 25Y, 25M, 25C and 25K. Each primary transfer roller transfers the toner image on the surface of each photoconductive drum 7 onto the intermediate transfer belt 27 (primary transfer).

The transfer section 28 is arranged at a position adjacent to the image forming section 25K in the intermediate transfer belt 27.

The transfer section 28 includes the support roller 28a and a secondary transfer roller 28b. The secondary transfer roller 28b and the support roller 28a sandwich the intermediate transfer belt 27. A position at which the secondary transfer roller 28b and the intermediate transfer belt 27 abut against each other is a secondary transfer position.

The transfer section 28 transfers the charged toner image on the intermediate transfer belt 27 onto the surface of the sheet Sat the secondary transfer position. The transfer section 28 applies a transfer bias to the secondary transfer position. The transfer section 28 transfers the toner image on the intermediate transfer belt 27 onto the sheet S through the transfer bias.

The fixing device 29 applies heat and pressure to the sheet S. The fixing device 29 fixes the transferred toner image to the sheet S through the heat and the pressure.

The transfer belt cleaning unit 35 faces the transfer belt roller 32. The transfer belt cleaning unit 35 sandwiches the intermediate transfer belt 27. The transfer belt cleaning unit 35 scrapes the toner on the surface of the intermediate transfer belt 27.

The main body control section 6 controls the respective device parts of the image forming apparatus 100.

Next, the detailed configuration of the bearing device of the first embodiment included in each of the image forming sections 25Y, 25M, 25C and 25K is described.

Figure 2:
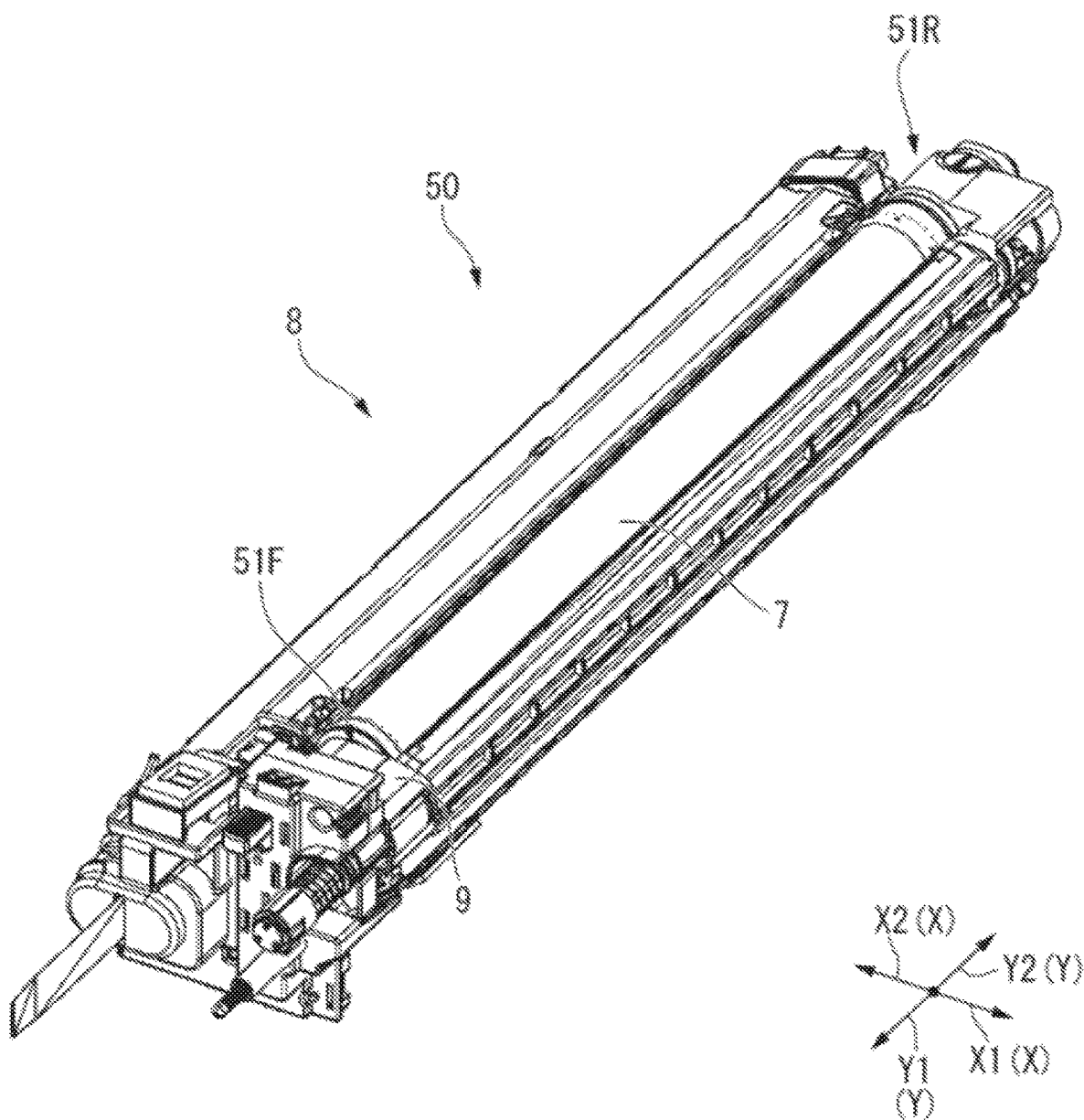
FIG. 2 is a perspective view schematically illustrating an image forming unit of the image forming apparatus according to the first embodiment.
Figure 3:
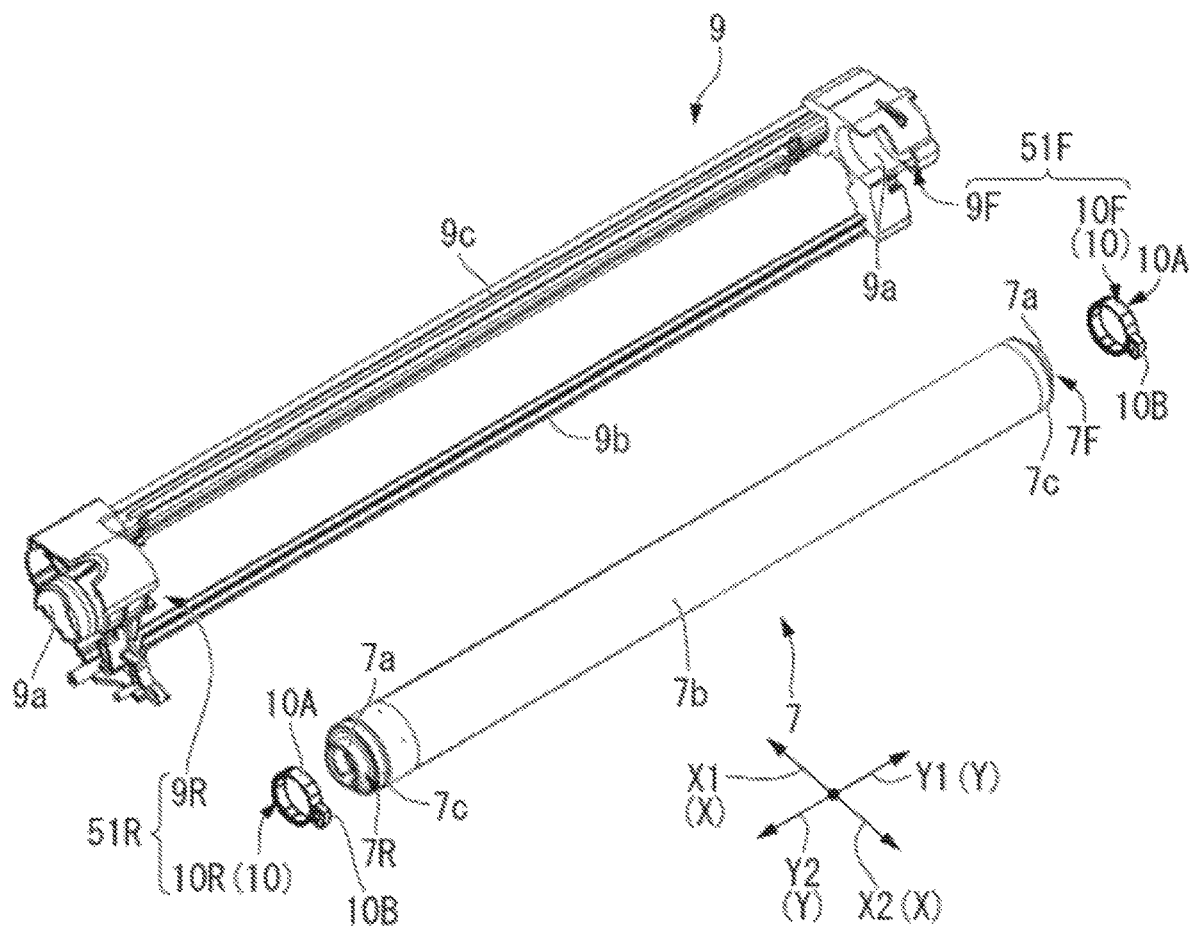
FIG. 3 is an exploded perspective view illustrating a bearing device according to the first embodiment in the image forming unit.
Figure 4:
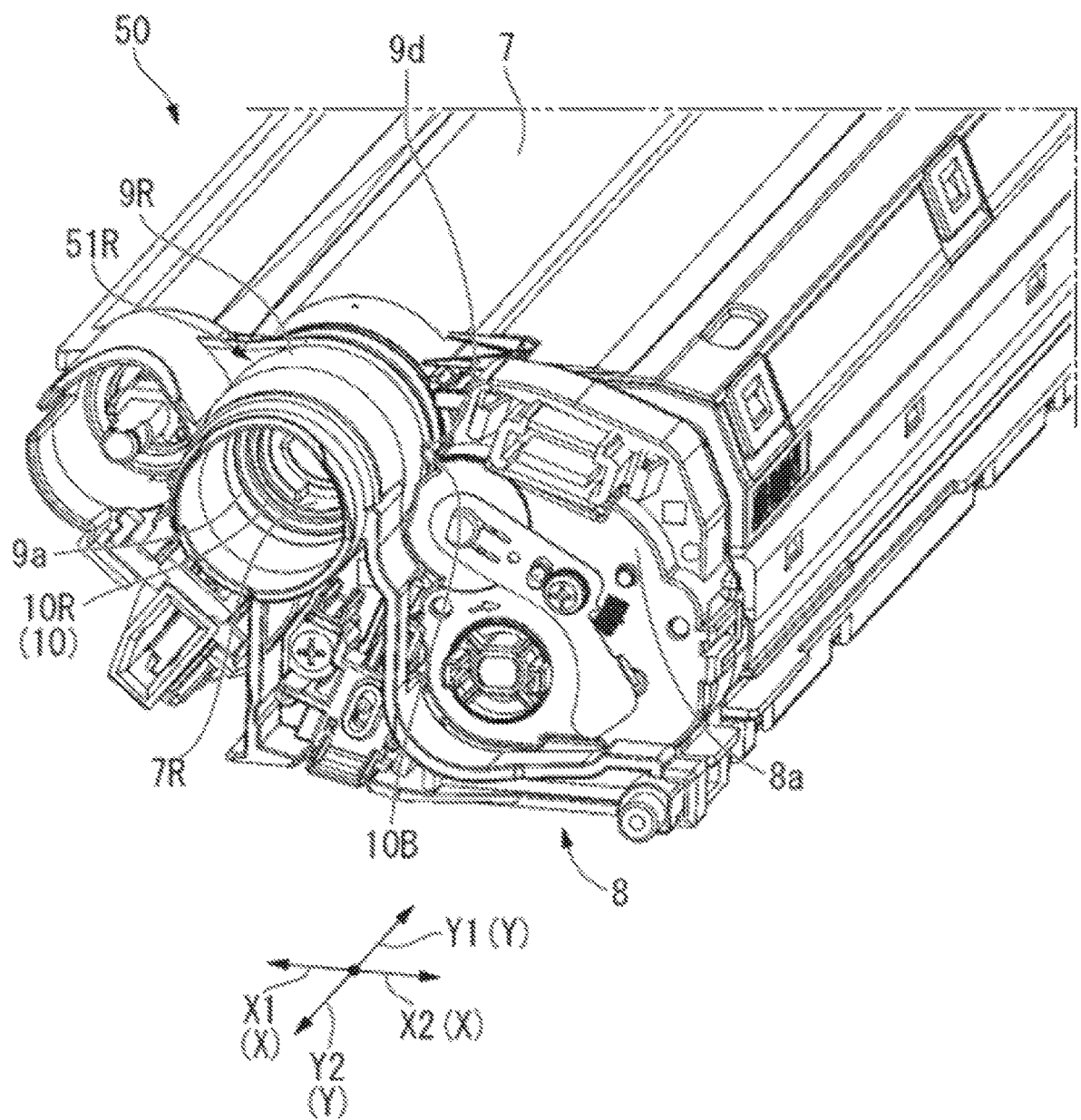
FIG. 4 is a perspective view schematically illustrating an end on a rear side of the image forming unit.
Figure 5:
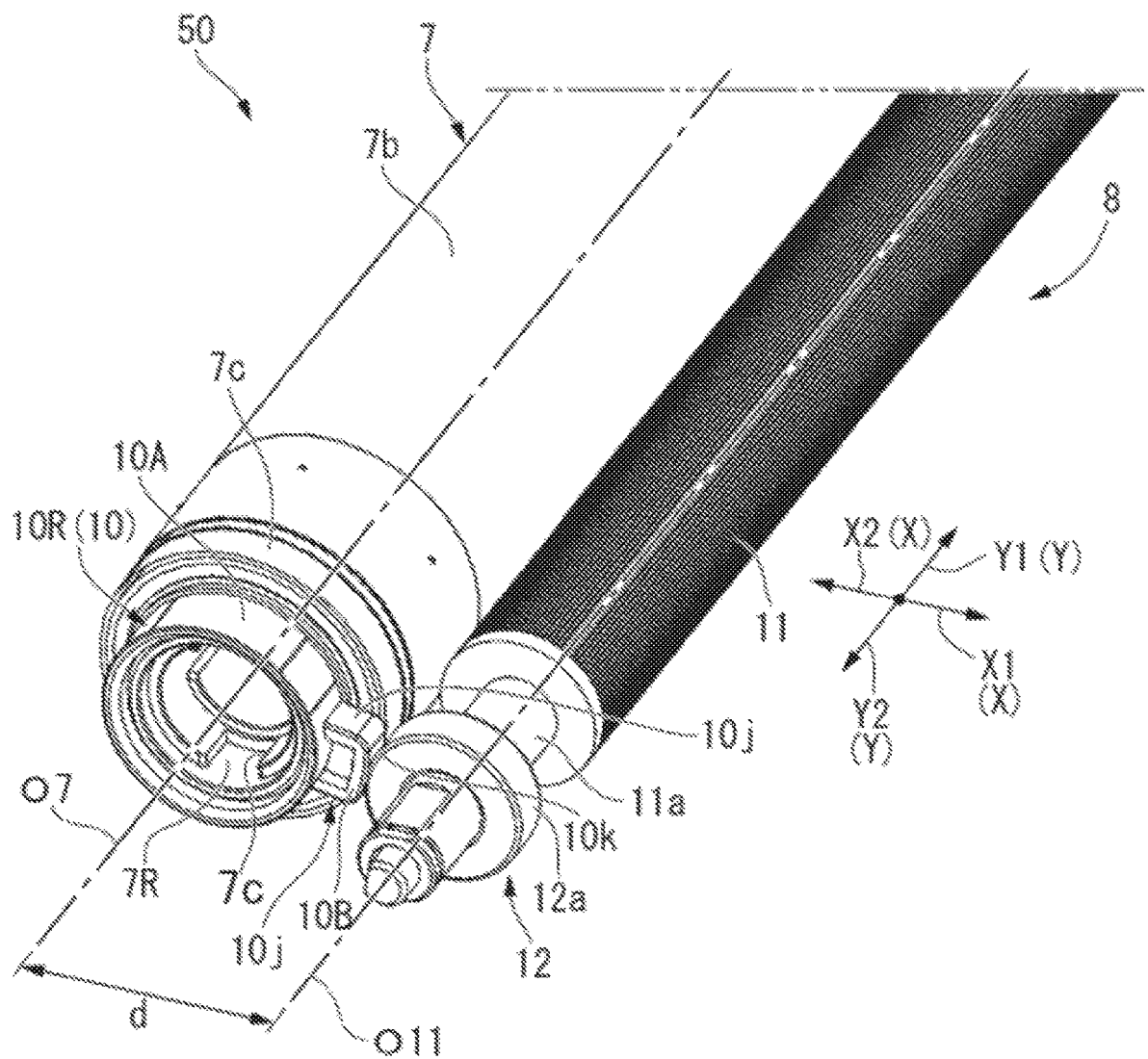
FIG. 5 is a perspective view schematically illustrating a relationship between the bearing device according to the first embodiment and a developing roller.

FIG. 2 is a perspective view schematically illustrating an image forming unit of the image forming apparatus according to the first embodiment. FIG. 3 is an exploded perspective view illustrating the bearing device according to the first embodiment in the image forming unit. FIG. 4 is a perspective view schematically illustrating an end on a rear side of the image forming unit. FIG. 5 is a perspective view schematically illustrating a relationship between the bearing device according to the first embodiment and a developing roller.

As shown in FIG. 2, an image forming unit 50 includes the photoconductive drum 7, a housing 9, bearing devices 51F and 51R, and a developing device 8. The image forming unit 50 is included in each of the image forming sections 25Y, 25M, 25C and 25K described above.

As shown in FIG. 3, the photoconductive drum 7 includes a drum main body 7b, a drum flange 7c and shafts 7F and 7R.

The drum main body 7b is formed by a cylinder extending in the Y direction. A photoconductive layer is formed on the surface of the drum main body 7b.

The drum flange 7c is a disc-like member having an outer diameter approximately equal to that of the drum main body 7b. The drum flanges 7c are fixed to both ends of the drum main body 7b in a longitudinal direction (Y direction) thereof.

In the drum flange 7c provided at the end in the Y1 direction, the cylindrical shaft 7F having a diameter smaller than that of the drum main body 7b protrudes in the Y1 direction. The shaft 7R having the same shape as the shaft 7F protrudes in the Y2 direction in the drum flange 7c provided at the end in the Y2 direction.

As material of the shafts 7F and 7R, for example, POM (polyacetal), PBT (polybutylene terephthalate) or the like having sliding property may be used.

The housing 9 holds the photoconductive drum 7. The material of the housing 9 is, for example, a resin material with a reinforcing filler for the purpose of achieving a shape accuracy and rigidity of the housing 9.

As shown in FIG. 3, the housing 9 includes holding portions 9F and 9R and beam members 9b and 9c.

The holding portions 9F and 9R are respectively provided at an end in the Y1 direction and an end in the Y2 direction of the housing 9. The holding portions 9F and 9R accommodate sliding bearings 10F and 10R described below therein, respectively. The holding portions 9F and 9R and the sliding bearings 10F and 10R described below constitute bearing devices 51F and 51R, respectively.

The holding portions 9F and 9R are cylindrical members in which inner circumferential surfaces 9a (i.e., inner circumferential portions) each having a substantially cylindrical surface shape respectively penetrate in the Y direction at the centers thereof. The holding portions 9F and 9R are connected to each other via beam members 9b and 9c extending in the Y direction such that the respective inner circumferential surfaces 9a are coaxial.

The sliding bearings 10F and 10R may not be formed in the same shape, but in the present embodiment, they are formed in the same shape. The sliding bearings 10F and 10R each have an annular portion 10A and a locking portion 10B.

The inner circumferential portions of the annular portions 10A are slidably fitted to the outer circumferential surfaces 7a of the shafts 7F and 7R of the photoconductive drum 7. The outer circumferential portions of the annular portions 10A are fitted to the inner circumferential surfaces 9a (inner circumferential portion) of the holding portions 9F and 9R. The detailed configuration of the annular portion 10A is described below.

The locking portion 10B protrudes outwards in a radial direction from the outer circumferential portion of the annular portion 10A. The shape of the locking portion 10B is a substantially rectangular shape when viewed from the Y direction.

As shown in the example of the end in the Y2 direction in FIG. 4, in the image forming unit 50 in an assembled state, the photoconductive drum 7 and the developing device 8 are arranged to face each other in the X direction. The developing device 8 has a developing case 8a. In the developing case 8a, a developer and known members necessary for development (developer conveyance screw, developing roller, etc.) are accommodated.

The sliding bearing 10R is fixed to the holding portion 9R in a state of being inserted to the inner circumferential surface 9a of the holding portion 9R. The shaft 7R of the photoconductive drum 7 is inserted to the inner circumferential portion of the sliding bearing 10R.

The locking portion 10B protrudes from the holding portion 9R towards the developing device 8. The locking portion 10B is stopped by a groove 9d described below in the holding portion 9R. The tip in a protruding direction of the locking portion 10B is locked to a ball bearing 12 (not shown) described below provided at the inside of the developing device 8.

Although not particularly shown, the positional relationship between respective members at the end of the image forming unit 50 in the Y1 direction is also the same as that described above.

FIG. 5 shows the arrangement of the main portions in the image forming unit 50.

The developing roller 11 (i.e., a second rotation member) for developing the electrostatic latent image formed on the photoconductive drum 7 is arranged in the developing case 8a (not shown). At both ends of the developing roller 11, a rotating shaft 11a coaxial with the developing roller 11 protrudes. However, FIG. 5 shows the rotating shaft 11a at the end in the Y2 direction. The rotating shaft 11a is supported by the developing case 8a (not shown) via the ball bearing 12 (i.e., a support body).

The locking portion 10B is locked to the outer circumferential surface 12a of the ball bearing 12 at a tip 10k thereof. Therefore, a distance between a central axis of the annular portion 10A and a central axis of the ball bearing 12 is the sum of a distance from the central axis of the annular portion 10A to the tip of the locking portion 10B and a distance from the outer circumferential surface 12a to a central axis of the ball bearing 12. An inter-axis distance between a central axis O7 of the photoconductive drum 7 supported by the sliding bearing 10R and a central axis O11 of the developing roller 11 supported by the ball bearing 12 is maintained at a constant value d.

Although not particularly shown, the inter-axis distance between the central axes O7 and O11 is maintained at the constant value d in the same manner at the end in the Y1 direction. Thus, a value of the inter-axis distance d determined by the locking portion 10B is a dimension at which a necessary developing gap is formed between the surface of the drum main body 7b and the surface of the developing roller 11.

The sliding bearing 10 can maintain the distance between the photoconductive drum 7 and the developing roller 11 with high accuracy by having the locking portion 10B.

Next, the detailed configurations of the sliding bearings 10F and 10R are described. In the present embodiment, since the shapes of the sliding bearings 10F and 10R are the same, the sliding bearings 10F and 10R are referred to as a sliding bearing 10 if the arrangement positions thereof are not necessarily distinguished from each other.

Figure 6:
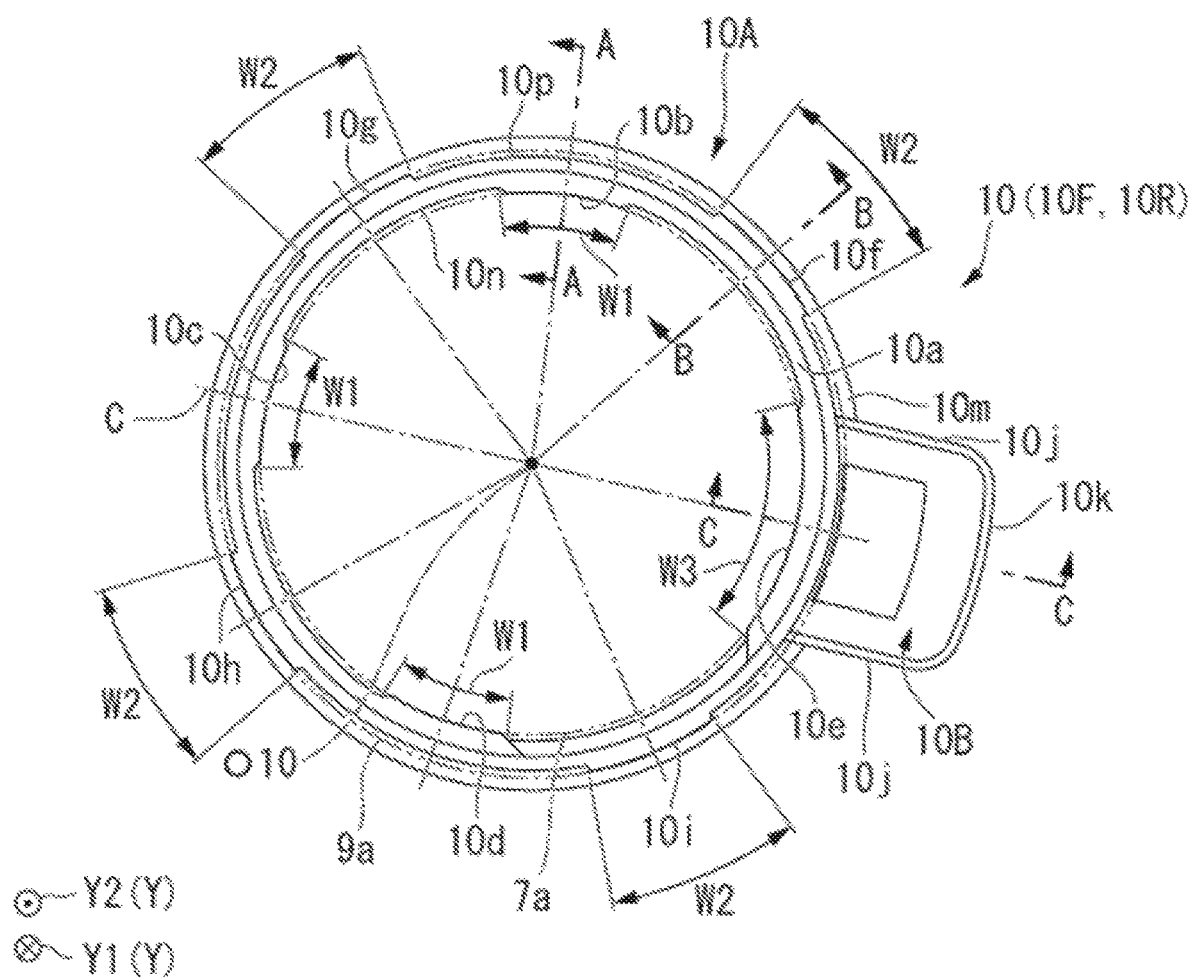
FIG. 6 is a front view schematically illustrating a sliding bearing in the bearing device according to the first embodiment.
Figure 7:
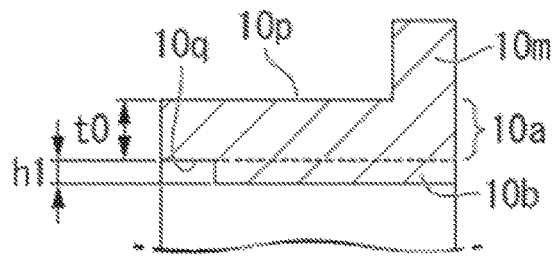
FIG. 7 is a cross-sectional view taken along a line A-A in FIG. 6.
Figure 8:
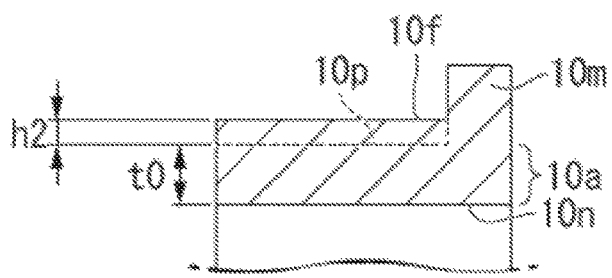
FIG. 8 is a cross-sectional view taken along a line B-B in FIG. 6.
Figure 9:
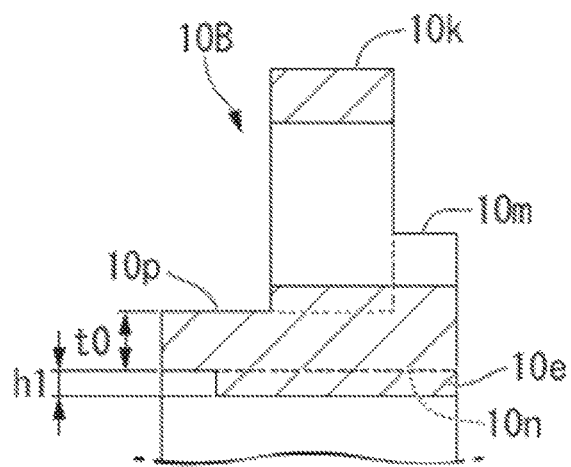
FIG. 9 is a cross-sectional view taken along a line C-C in FIG. 6.

FIG. 6 is a front view schematically illustrating the sliding bearing in the bearing device according to the first embodiment. FIG. 7 is a cross-sectional view taken along a line A-A in FIG. 6. FIG. 8 is a cross-sectional view taken along a line B-B in FIG. 6. FIG. 9 is a cross-sectional view taken along a line C-C in FIG. 6.

As shown in FIG. 6, the annular portion 10A of the sliding bearing 10 includes a main body 10a, first protrusions 10b, 10c, 10d and 10e, second protrusions 10f, 10g, 10h and 10i, and a flange 10m.

The main body 10a is formed in a cylindrical shape. A diameter of an inner circumferential surface 10n (i.e., an inner circumferential portion) of the main body 10a is larger than an outer diameter of the outer circumferential surface 7a of each of the shafts 7F and 7R of the photoconductive drum 7. An outer diameter of an outer circumferential surface 10p (i.e., an outer circumferential portion) of the main body 10a is smaller than an inner diameter of the inner circumferential surface 9a of each of the holding portions 9F and 9R.

The first protrusions 10b, 10c, 10d and 10e protrude inward in the radial direction from the main body 10a. The first protrusions 10b, 10c, 10d and 10e are separated from one another in a circumferential direction. The first protrusions 10b, 10c, 10d and 10e are arranged in this order counterclockwise as shown in FIG. 6.

Tips in protruding directions of the first protrusions 10b, 10c, 10d and 10e are aligned on a cylindrical surface having constant diameter and being coaxial with the central axis O10 of the annular portion 10A. The distance from the central axis O10 to the tips of the first protrusions 10b, 10c, 10d and 10e is a distance at which the outer circumferential surface 7a can be slidably fitted.

Thus, the tips in the protruding directions of the first protrusions 10b, 10c, 10d and 10e each have a curved surface of which a curvature is close to that of the outer circumferential surface 7a.

The first protrusion 10e protrudes in the radial direction from the inner circumferential surface 10n on a back side of the locking portion 10B. A magnitude of a width of the first protrusion 10e in the circumferential direction is W3. W3 is larger than a width in the circumferential direction of abase end of the locking portion 10B. For this reason, the first protrusion 10e is formed in a range covering the base end of the locking portion 10B as viewed in the radial direction.

The first protrusion 10c protrudes from the inner circumferential surface 10n at a position facing the first protrusion 10e across the central axis O10 in the radial direction. A magnitude of the width of the first protrusion 10c in the circumferential direction is W1. W1 is not particularly limited as long as it is appropriately set in consideration of a sliding property against the shafts 7F and 7R. For example, W1 may be narrower than an interval between first protrusions adjacent to each other in the circumferential direction.

The relationship between the magnitudes of W1 and W3 is not particularly limited. In the example shown in FIG. 6, W1 is smaller than W3.

The first protrusions 10b and 10d are respectively arranged at positions equally bisecting intervals between the first protrusions 10c and 10e. The magnitudes of widths in the circumferential direction of the first protrusions 10b and 10d may be appropriately set in consideration of the sliding property against the shafts 7F and 7R. In the example shown in FIG. 6, the magnitude of each width is W1, as with the first protrusion 10c.

It is more preferable that the first protrusions 10b, 10c, 10d and 10e protrude from the inner circumferential surface 10n to such an extent that the inner circumferential surface 10n does not abut against the outer circumferential surface 7a even in consideration of thermal deformation of the sliding bearing 10 when the sliding bearing 10 is used.

As shown in FIG. 7, a thickness of the main body 10a is to, and a protruding height of the first protrusion 10b is h1. Although not shown particularly, the protruding height of each of the first protrusions 10c, 10d and 10e is also h1.

In the example shown in FIG. 6, the first protrusions 10b, 10c, 10d and 10e and the locking portion 10B are arranged in a linearly symmetric manner with respect to an axis line C passing through the central axis O10 and the center of the locking portion 10B.

The second protrusions 10f, 10g, 10h and 10i protrude outward in the radial direction from the main body 10a. The second protrusions 10f, 10g, 10h and 10i are separated from one another in the circumferential direction. The second protrusions 10f, 10g, 10h and 10i are arranged in this order counterclockwise as shown in FIG. 6.

The tips in protruding directions of the second protrusions 10f, 10g, 10h and 10i are aligned on a cylindrical surface having constant diameter and being coaxial with the central axis O10 of the annular portion 10A. The distance from the central axis O10 to the tips of the second protrusions 10f, 10g, 10h and 10i is approximately equal to a radius of the inner circumferential surface 9a. As described below, the outer circumferential portion of the sliding bearing 10 does not rotate against the holding portions 9F and 9R. For this reason, the distance from the central axis O10 to the tips of the second protrusions 10f, 10g, 10h and 10i may be larger than the radius of the inner circumferential surface 9a as long as the sliding bearing 10 can be slightly inserted into the inner circumferential surface 9a.

Thus, the tips in the protruding directions of the second protrusions 10f, 10g, 10h and 10i each have a curved surface of which the curvature is close to that of the inner circumferential surface 9a.

For example, it is more preferable that the arrangement positions of the second protrusions 10f, 10g, 10h and 10i shift from the arrangement positions of the first protrusions 10b, 10c, 10d and 10e in the circumferential direction of the main body 10a. The arrangement position in the circumferential direction refers to a center position of the width in the circumferential direction.

In a case in which the second protrusions 10f, 10g, 10h and 10i are arranged in this manner, as compared with a case in which the first protrusions and the second protrusions all overlap with each other correspondingly, the number of thick portions at which the first protrusion and the second protrusion overlap with each other in the radial direction is reduced.

For example, it is more preferable that the second protrusions 10f, 10g, 10h and 10i are not arranged on the main body 10a on the back side of the first protrusions 10b, 10c, 10d and 10e.

In this case, since the first protrusions and the second protrusions do not face each other across the main body 10a as viewed in the radial direction, the sliding bearing 10 is not provided with thick portions at which the first protrusion and the second protrusion overlap with each other in the radial direction.

It is further preferable that the main body 10a is exposed between the first protrusion and the second protrusion adjacent to each other in the circumferential direction as viewed in the radial direction.

For example, it is more preferable that each of the second protrusions 10f, 10g, 10h and 10i is arranged in the middle of the first protrusions adjacent to each other in the circumferential direction. In particular, it is further preferable that each of the second protrusions 10f, 10g, 10h and 10i is arranged at a position bisecting an arrangement interval between the first protrusions adjacent to each other in the circumferential direction.

For example, the width in the circumferential direction of each of the second protrusions 10f, 10g, 10h and 10i is more preferably narrower than the arrangement interval between the first protrusions adjacent to each other in the circumferential direction.

In the example shown in FIG. 6, the second protrusion 10f is arranged at a position bisecting the arrangement interval between the first protrusions 10e and 10b in the circumferential direction. The magnitude of the width of the second protrusion 10f is W2. W2 is narrower than the arrangement interval between the first protrusions 10e and 10b. Therefore, if viewed in the radial direction, the main body 10a is exposed between the first protrusion 10e and the second protrusion 10f, and between the second protrusion 10f and the first protrusion 10b. The exposed areas of the main body 10a are equal to each another.

The second protrusion 10g is arranged at a position bisecting the arrangement interval between the first protrusions 10b and 10c in the circumferential direction. A width of the second protrusion 10g is W2, as with the second protrusion 10f.

The second protrusion 10h is arranged at a position bisecting the arrangement interval between the first protrusions 10c and 10d in the circumferential direction. A width of the second protrusion 10h is W2, as with the second protrusion 10f.

The second protrusion 10i is arranged at a position bisecting the arrangement interval between the first protrusions 10d and 10e in the circumferential direction. A width of the second protrusion 10i is W2, as with the second protrusion 10f.

It is more preferable that the second protrusions 10f, 10g, 10h and 10i protrude from the outer circumferential surface 10p to such an extent that the outer circumferential surface 10p does not abut against the inner circumferential surface 9a even in consideration of the thermal deformation of the sliding bearing 10 when the sliding bearing 10 is used.

As shown in FIG. 8, a protruding height of the second protrusion 10f is h2. Although not particularly shown, the protruding heights of the second protrusions 10g, 10h and 10i are also h2.

It is more preferable that h2 be smaller than t0. It is more preferable that h2 is larger than h1.

In the example shown in FIG. 6, the second protrusions 10f, 10g, 10h and 10i are arranged in a linearly symmetric manner with respect to the axis line C.

The flange 10m protrudes outward in the radial direction from the end of the main body 10a in the Y1 direction. The flange 10m protrudes uniformly over the entire circumference of the main body 10a except for the protruding area of the locking portion 10B.

As shown in FIG. 8, in the present embodiment, the protruding height of the flange 10m from the outer circumferential surface 10p of the main body 10a is larger than h2.

The flange 10m functions as a reinforcing rib that increases the rigidity of the main body 10a. However, the flange 10m may be omitted if the rigidity necessary for the main body 10a can be obtained even without the flange 10m.

Furthermore, the flange 10m may also be used as the locking portion in the Y direction of the sliding bearing 10. However, if the flange 10m may not be used as the locking surface, the flange 10m may be omitted.

The material of the sliding bearing 10 is a resin material having good sliding property. For this reason, the material of the sliding bearing 10 has a thermal expansion coefficient larger than that of the resin material with a reinforcing filler which is used for the housing 9.

Next, a configuration of a bearing device 51R in an assembled state is described with reference to FIG. 10.

Figure 10:
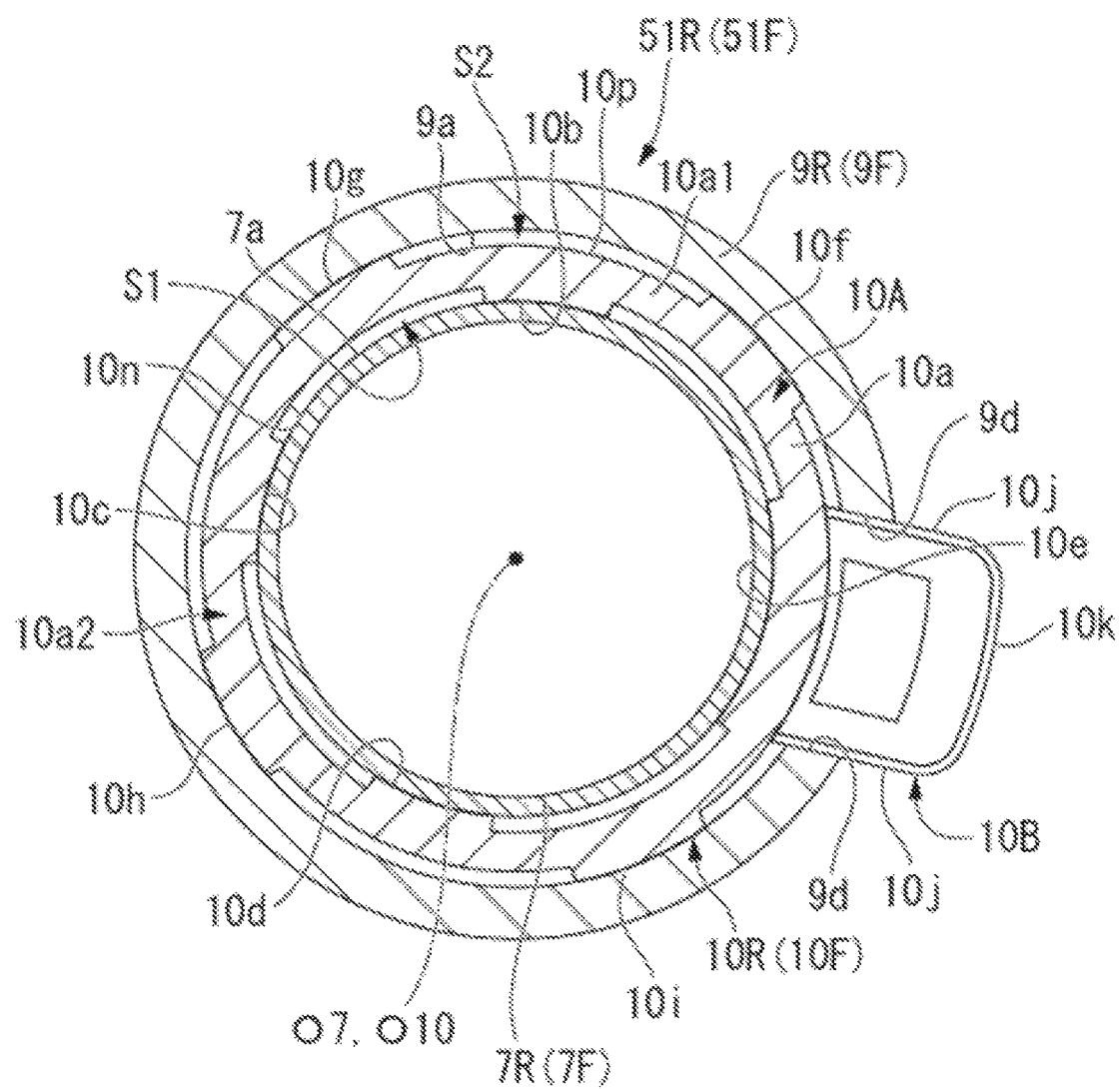
FIG. 10 is a cross-sectional view schematically illustrating a configuration of the bearing device according to the first embodiment.

FIG. 10 is a cross-sectional view schematically illustrating a configuration of the bearing device according to the first embodiment.

As shown in FIG. 10, the sliding bearing 10R is fitted to the inside of the inner circumferential surface 9a of the holding portion 9R. The shaft 7R is fitted to the inside of the sliding bearing 10R. Thereby, the central axis O7 of the photoconductive drum 7 (not shown) and the central axis O10 of the sliding bearing 10R are coaxially arranged.

Side surfaces 10j in the circumferential direction of the locking portion 10B of the sliding bearing 10R are inserted to the groove 9d of the holding portion 9R (not shown) in the protruding direction. Thereby, the position of the locking portion 10B in the circumferential direction is fixed with respect to the holding portion 9R.

Between the inner circumferential surface 10n and the outer circumferential surface 7a, gaps S1 are formed between the first protrusions adjacent to each other in the circumferential direction.

Between the outer circumferential surface 10p and the inner circumferential surface 9a, gaps S2 are formed between the second protrusions adjacent to each other in the circumferential direction.

With such a configuration, for example, the first protrusion 10b between the second protrusions 10f and 10g protrudes inward in the radial direction from the middle portion in the circumferential direction of a main body 10a1 extending in the circumferential direction between the second protrusions 10f and 10g.

For example, the second protrusion 10h between the first protrusions 10c and 10d protrudes outward in the radial direction from the middle portion in the circumferential direction of a main body 10a2 extending in the circumferential direction between the first protrusions 10c and 10d.

Similarly, the bearing device 51F has the same configuration as that in the above-mentioned assembled state.

Next, the effect of the image forming apparatus 100 is described by mainly focusing on the actions of the bearing devices 51R and 51F.

First, an image forming operation of the image forming apparatus 100 is briefly described.

In the image forming apparatus 100 shown in FIG. 1, the image formation operation is started in response to an operation on the control panel 1 or an external signal. The image information is generated by reading out an object to be copied by the scanner section 2 and then transmitted to the printer section 3 or is transmitted to the printer section 3 from an external device. The printer section 3 feeds the sheet S from the sheet feed section 4 to the registration roller 24. The sheet S fed from the sheet feed section 4 is selected by the main body control section 6 based on the operation on the control panel 1 or the external signal.

If an operation input for image formation is made from the control panel 1, the main body control section 6 performs control to start sheet feeding from a sheet feed cassette and image formation.

The image forming sections 25Y, 25M, 25C and 25K form electrostatic latent images on respective photoconductive drums 7 based on image information corresponding to respective colors. The electrostatic latent images are developed by the developing device 8, respectively. For this reason, toner images corresponding to the electrostatic latent images are formed on the surfaces of photoconductive drums 7, respectively.

The respective toner images are primarily transferred onto the intermediate transfer belt 27 by respective transfer rollers. The respective toner images are sequentially superimposed without color shift as the intermediate transfer belt 27 moves, and then are transmitted to the transfer section 28.

The sheet S is fed from the registration roller 24 to the transfer section 28. The toner image arriving at the transfer section 28 is secondarily transferred onto the sheet S. The secondarily transferred toner image is fixed to the sheet S by the fixing device 29. Thus, an image is formed on the sheet S.

In such an image forming process, if rotation unevenness occurs in the photoconductive drum 7, there is a problem that image unevenness occurs in synchronization with the rotation unevenness. In particular, in a case in which the sliding bearing is used as a bearing for the photoconductive drum 7, an increase in rotational load caused by thermal deformation of the sliding bearing is likely to cause rotation unevenness.

The sliding bearing has a thermal expansion coefficient larger than that of the holding portion of the housing that holds the sliding bearing, and thus deformation in the radial direction of the outer circumferential portion thereof is restrained by the holding portion if the temperature rises. The sliding bearing expands inward in the radial direction. Specifically, an inner diameter of the sliding bearing tends to decrease as the temperature rises. As a result, the rotational load on the photoconductive drum 7 is increased.

The effect of suppressing the increase in the rotational load on the photoconductive drum 7 in the bearing devices 51F and 51R of the present embodiment is described below.

Figure 11:
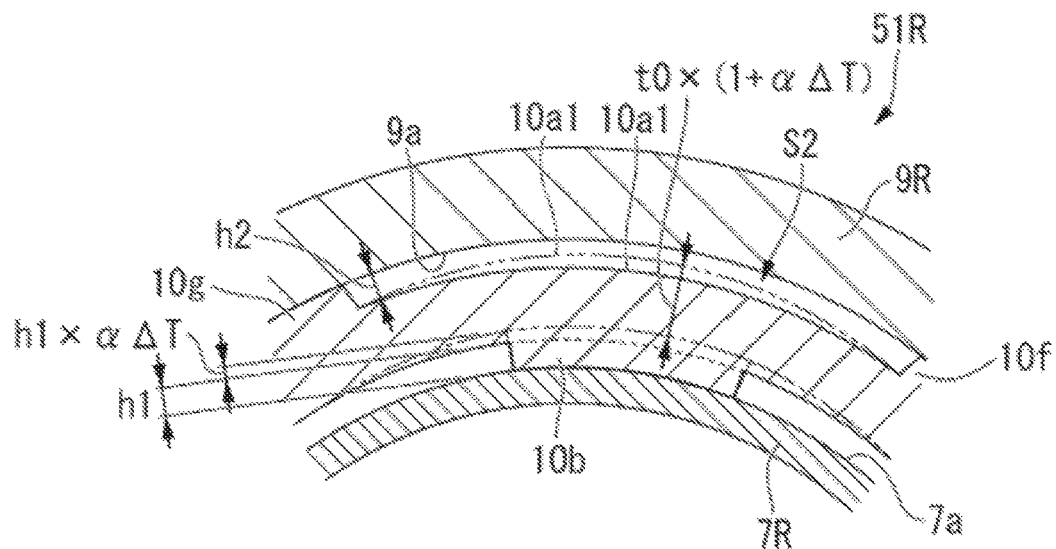
FIG. 11 is a cross-sectional view schematically illustrating an effect of the bearing device according to the first embodiment.
Figure 12:
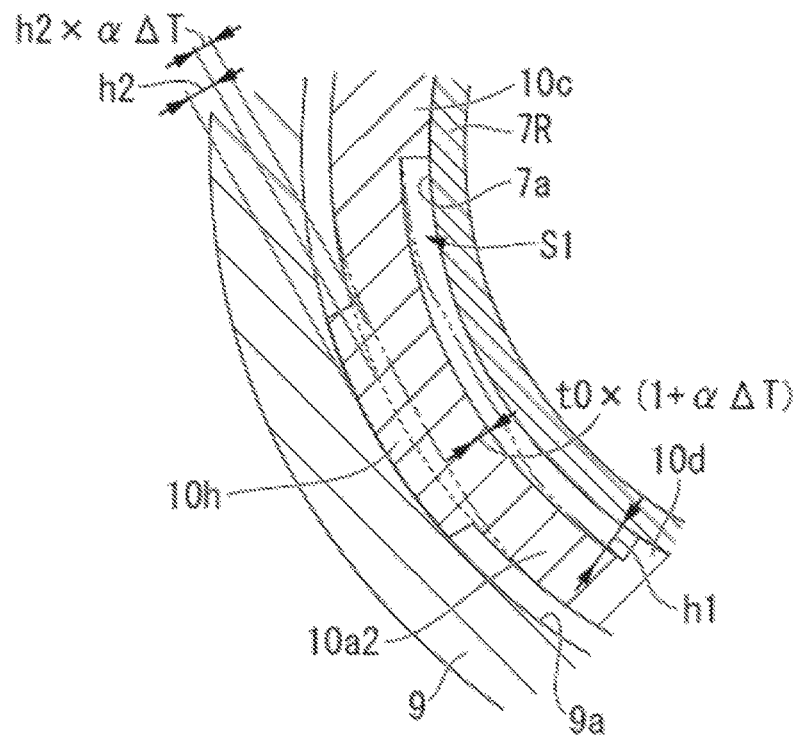
FIG. 12 is a cross-sectional view schematically illustrating the effect of the bearing device according to the first embodiment.

FIG. 11 and FIG. 12 are cross-sectional views schematically illustrating the effect of the bearing device according to the first embodiment.

The main portions of the bearing device 51F have the same configurations as those of the bearing device 51R. Therefore, the bearing device 51R is described as an example in the following.

As the photoconductive drum 7 rotates, the temperature of the sliding bearing 10 rises due to frictional heat between the shaft 7R and the sliding bearing 10. The frictional heat due to sliding also raises the temperature of each of the sliding bearing 10, the shaft 7R and the holding portion 9R.

However, in the bearing device 51R, the sliding bearing 10 contacts a part of the outer circumferential surface 7a of the shaft 7R through the first protrusions 10b, 10c, 10d and 10e. For this reason, an amount of generated frictional heat is reduced as compared to a sliding bearing that frictionally slides against the entire circumference of the outer circumferential surface 7a. In addition, an amount of heat conducted to the shaft 7R and the holding portion 9R is also reduced. Furthermore, at the time of sliding, the temperature rise is suppressed considering that air flows through the gaps S1 and S2.

However, as the photoconductive drum 7 rotates, the temperature of each portion of the bearing device 51R rises. Since the thermal expansion coefficient of the material of the shaft 7R and the holding portion 9R is smaller than that of the material of the sliding bearing 10, an amount of thermal expansion thereof is smaller than that of the sliding bearing 10.

In the following, for the convenience of description, only the sliding bearing 10 is relatively thermally expanded according to the difference in the thermal expansion coefficient. A relative thermal expansion coefficient of the sliding bearing 10 is set to α.

For example, as shown in FIG. 11, if the first protrusion 10b and the main body 10a1 are thermally expanded in response to a temperature rise ΔT, a protruding height of the first protrusion 10b increases to $h1*(1+\alpha\Delta T)$, and a thickness of the main body 10a1 increases to $t0*(1+\alpha\Delta T)$.

However, both ends of the main body 10a1 are supported by the second protrusions 10f and 10g. For this reason, the main body 10a1 is subjected to three-point bending, and bends outward in the radial direction as indicated by a two-dot chain line in FIG. 11.

In the present embodiment, the gap S2 having the height h2 is formed between the inner circumferential surface 9a and the main body 10a1 at the outside in the radial direction of the main body 10a1. As a result, if the bending of the main body 10a1 is less than h2, a pressing force from the inner circumferential surface 9a has no effect on the back side of the first protrusion 10b. Therefore, since the thermally expanded main body 10a1 abuts against the inner circumferential surface 9a, a surface pressure acting on the shaft 7R from the first protrusion 10b is reduced as compared with the case in which the deformation of the main body 10a1 is restrained.

Even if the bending of the main body 10a1 is equal to or larger than h2 and the main body 10a1 contacts the inner circumferential surface 9a, a reaction force from the inner circumferential surface 9a is reduced as compared with the case in which no gap S2 is arranged. For this reason, the surface pressure acting on the shaft 7R from the first protrusion 10b can be reduced.

For example, as shown in FIG. 12, if the second protrusion 10h and the main body 10a2 are thermally expanded in response to the temperature rise ΔT, a protruding height of the second protrusion 10h increases to $h2*(1+\alpha\Delta T)$, and a thickness of the main body 10a2 increases to $t0*(1+\alpha\Delta T)$.

However, both ends of the main body 10a1 are supported by the second protrusions 10f and 10g. For this reason, the main body 10a2 is subjected to three-point bending, and bends inward in the radial direction as indicated by a two-dot chain line in FIG. 12.

In the present embodiment, the gap S1 having the height h1 is formed between the outer circumferential surface 7a and the main body 10a2 at the outside in the radial direction of the main body 10a2. As a result, if the bending of the main body 10a2 is smaller than h1, no pressing force acts on the outer circumferential surface 7a from the main body 10a2 on the back side of the second protrusion 10h. For this reason, since the thermally expanded main body 10a2 presses the outer circumferential surface 7a, the increase in the sliding load on the outer circumferential surface 7a can be suppressed.

Even if the bending of the main body 10a2 is equal to or larger h1, and the main body 10a2 contacts the outer circumferential surface 7a, as compared with the case in which no gap S1 is provided, a reaction force from the outer circumferential surface 7a can be reduced. For this reason, the surface pressure acting on the shaft 7R from the first protrusion 10b can be reduced.

In the above, the thermal expansion in the radial direction of the sliding bearing 10 is mainly described. However, even if the main body 10a is expanded in diameter due to the thermal expansion in the circumferential direction of the main body 10a, the deformation in the radial direction thereof is restrained by the holding portion 9R. Therefore, an amount of expansion in the circumferential direction thereof is also absorbed through the bending of the main body 10a as described above. As a result, the sliding load between the shaft 7R and the sliding bearing 10 is reduced as described above.

Since the locking portion 10B is separated from a sliding surface, an amount of temperature rise thereof is smaller than that of the annular portion. However, the annular portion 10A at the base end in the protruding direction of the locking portion 10B is easily thermally deformed.

In the present embodiment, since the first protrusion 10e is arranged on the back side of the base end of the locking portion 10B, no bending occurs in the main body 10a on the back side of the locking portion 10B. Therefore, a distanced between the tip 10k of the locking portion 10B and the central axis O10 does not change due to the bending of the main body 10a. As a result, according to the widths in the radical direction of the gaps S1 and S2, the distance d is fixed even if the other portions of the main body 10a in the circumferential direction bends.

Thus, in the present embodiment, even if the temperature of the sliding bearing 10 rises, the change in the inter-axis distance between the photoconductive drum 7 and the developing roller 11 and the developing gap which are determined by the locking portion 10B can be suppressed.

As described above, according to the bearing devices 51F and 51R of the present embodiment, since the sliding bearings 10R and 10F are respectively arranged, the sliding load in the shafts 7R and 7F of the photoconductive drum 7 at the time the temperature rises can be reduced.

According to the image forming apparatus 100 of the present embodiment, since the bearing devices 51F and 51R are arranged, the rotation unevenness occurring in the photoconductive drum 7 due to the increase of the sliding load can be suppressed, thereby reducing the image unevenness and enhancing an image quality.

Second Embodiment

A bearing device of the second embodiment is described with reference to the accompanying drawings.

Figure 13:
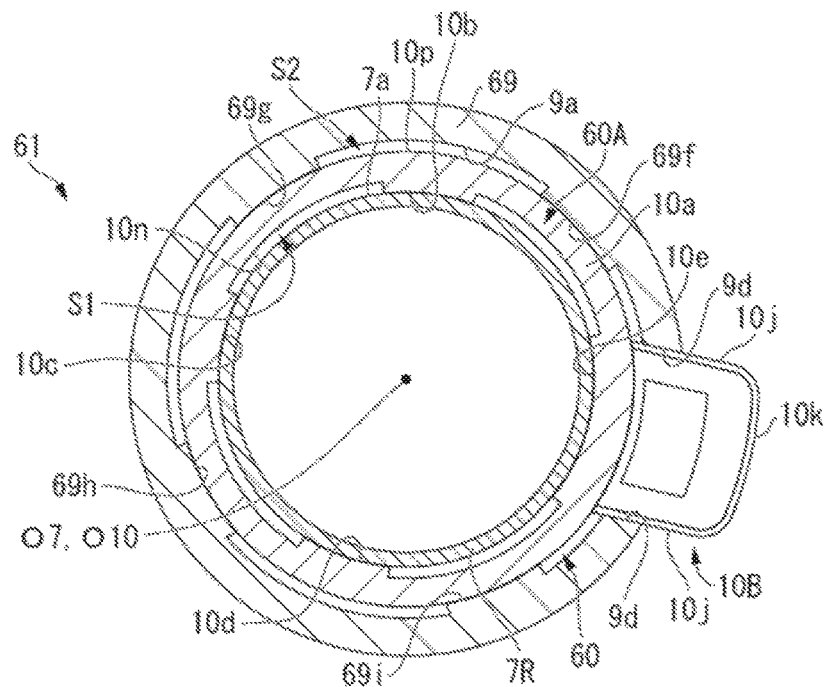
FIG. 13 is a cross-sectional view schematically illustrating a configuration of a bearing device according to a second embodiment.

FIG. 13 is a cross-sectional view schematically illustrating a configuration of the bearing device according to the second embodiment.

As for main portions shown in FIG. 13, a bearing device 61 of the present embodiment includes a holding portion 69 (i.e., housing) and a sliding bearing 60, instead of the holding portion 9R and the sliding bearing 10R of the bearing device 51R. The bearing device 61 can be used in the image forming apparatus 100 instead of the bearing device 51R by including the holding portion 69 instead of the holding portion 9R of the housing 9. Similarly, the bearing device 61 can be used in the image forming apparatus 100 instead of the bearing device 51F as well.

Below, differences from the first embodiment are mainly described.

The holding portion 69 has second protrusions 69f, 69g, 69h and 69i protruding inward in the radial direction from the inner circumferential surface 9a of the holding portion 9R in the first embodiment. The second protrusion 69f, 69g, 69h and 69i have the same shape as the second protrusions 10f, 10g, 10h and 10i in the first embodiment. The second protrusions 69f, 69g, 69h and 69i are formed at positions corresponding to the second protrusions 10f, 10g, 10h and 10i in the first embodiment.

The sliding bearing 60 has an annular portion 60A instead of the annular portion 10A in the first embodiment. The annular portion 60A has a shape in which the second protrusions 10f, 10g, 10h and 10i and the flange 10m of the annular portion 10A are omitted. Specifically, the outer circumferential portion of the annular portion 60A is formed by the outer circumferential surface 10p formed at portions excluding the locking portion 10B.

In the present embodiment, a plurality of second protrusions protrudes from the inner circumferential portion of the holding portion.

According to the bearing device 61 of the present embodiment, the main body 10a is supported in the radial direction by the second protrusions 69f, 69g, 69h and 69i protruding from the holding portion 69. A gap S2 similar to that in the first embodiment is formed between the second protrusions adjacent to each other in the circumferential direction.

According to the bearing device 61 of the present embodiment, the second protrusions 69f, 69g, 69h and 69i provided in the holding portion 69 have the same shape and arrangement in the circumferential direction as the second protrusions 10f, 10g, 10h and 10i in the first embodiment, and thus have the same effects as those in the first embodiment. Specifically, by arranging the holding portion 69 and the sliding bearing 60, the sliding load in the shaft 7R of the photoconductive drum 7 at the time the temperature rises can be reduced.

Furthermore, in the present embodiment, the sliding bearing 60 does not have the flange 10m. Therefore, the main body 10a is deformed more easily as compared with the case of including the flange 10m. Specifically, the change in dimension of the sliding bearing 60 due to the thermal expansion is more easily absorbed through the deformation such as the bending of the main body 10a. For this reason, the sliding load resulting from the thermal expansion of the sliding bearing 60 can be suppressed more efficiently.

According to the image forming apparatus provided with the bearing device 61 instead of the bearing devices 51R and 51F of the image forming apparatus 100, the rotation unevenness occurring in the photoconductive drum 7 caused by the increase in the sliding load can be suppressed, thereby reducing the image unevenness and enhancing the image quality.

Third Embodiment

A bearing device of the third embodiment is described with reference to FIG. 14.

Figure 14:
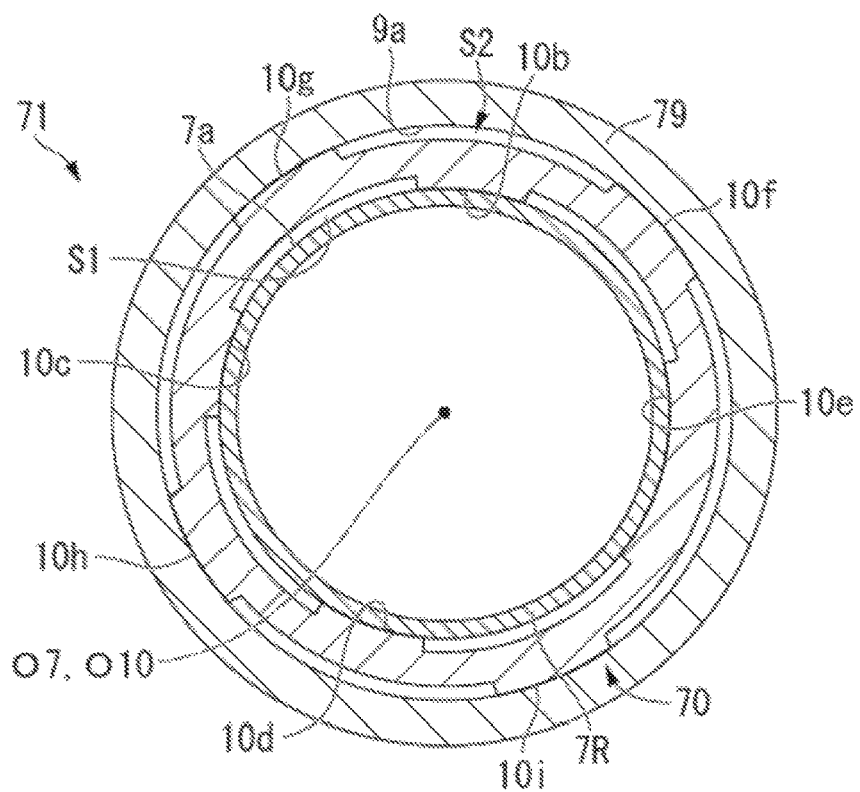
FIG. 14 is a cross-sectional view schematically illustrating a configuration of a bearing device according to a third embodiment.

FIG. 14 is a cross-sectional view schematically illustrating a configuration of the bearing device of the third embodiment.

As for the main portions shown in FIG. 14, a bearing device 71 of the present embodiment includes a holding portion 79 (i.e., housing) and a sliding bearing 70, instead of the holding portion 9R and the sliding bearing 10R of the bearing device 51R. The bearing device 71 can be used in the image forming apparatus 100 instead of the bearing device 51R by providing the holding portion 79 instead of the holding portion 9R of the housing 9. Similarly, the bearing device 71 can be used in the image forming apparatus 100 instead of the bearing device 51F.

Below, differences from the first embodiment are mainly described.

The holding portion 79 has a cylindrical shape in which the groove 9d of the holding portion 9R in the first embodiment is omitted.

The sliding bearing 70 has a shape obtained by omitting the locking portion 10B from the sliding bearing 10 in the first embodiment.

In the present embodiment, the sliding bearing does not have the locking portion.

Therefore, when used in the image forming apparatus 100, an inter-axis distance between the photoconductive drum 7 and the developing roller 11 is determined by a member different from the sliding bearing 10.

In the bearing device 71, the rotation of the sliding bearing 70 against the holding portion 79 is stopped, for example, by pressing the sliding bearing 70 into the inner circumferential surface 9a.

However, the operation for stopping the rotation of the sliding bearing 70 is not limited thereto. For example, a protrusion may be formed on the inner circumferential surface 9a to be engaged with any one of the second protrusions 10f, 10g, 10h and 10i in the circumferential direction. For example, an appropriate engagement structure may be provided between the flange 10m (not shown) and the side surface of the holding portion 79. For example, the sliding bearing 70 may be fixed to the holding portion 79 through adhesion, screwing, etc. at a position that does not inhibit the thermal deformation of the main body 10a.

According to the bearing device 71 of the present embodiment, since the bearing device 71 has the same configuration as the bearing device 51R of the first embodiment except that it does not have the locking portion 10B, the sliding load in the shaft 7R of the photoconductive drum 7 can be reduced at the time the temperature rises, as with the first embodiment.

Furthermore, in the present embodiment, since the locking portion 10B is not arranged, an external force acting on the locking portion 10B from the ball bearing 12 as in the first embodiment does not act on the sliding bearing 70. For this reason, the sliding load in the photoconductive drum 7 is further reduced.

According to the image forming apparatus including the bearing device 71 instead of the bearing devices 51R and 51F of the image forming apparatus 100, the rotation unevenness occurring in the photoconductive drum 7 caused by the increase in the sliding load can be suppressed, thereby reducing the image unevenness and enhancing the image quality.

According to at least one embodiment described above, the bearing device and the image forming apparatus capable of reducing the sliding load in the shaft of the first rotation member caused by the thermal expansion of the sliding bearing are provided.

Below, modifications of each embodiment mentioned above are described.

In the description of each embodiment, the bearing device of the embodiment supports the photoconductive drum 7. However, the bearing device may be used to support a rotation member other than the photoconductive drum 7 used in the image forming apparatus.

In the description of each embodiment, the first protrusion has a curved surface of which the curvature is close to that of the shaft. However, the configuration of the first protrusion is not limited to a configuration with a curved surface of which the curvature is close to that of the shaft, as long as it can slide well against the shaft of the first rotation member. For example, the first protrusion may be an aggregate of protrusions having hemispherical shape or the like in point contact with the shaft. For example, the first protrusion may be an aggregate of ridges linearly contact the shaft. For example, the first protrusion may have a rough surface having a large number of uneven structures.

In the description of each embodiment, the second protrusion has a curved surface of which the curvature is close to that of the inner circumferential portion of the holding portion. However, the configuration of the second protrusion is not limited to a configuration with the curved surface of which the curvature is close to that of the inner circumferential portion, as long as it can be locked to the inner circumferential portion of the holding portion. For example, the second protrusion may be an aggregate of protrusions having a hemispherical shape, a cylindrical shape, a truncated cone shape or the like. For example, the second protrusion may be an aggregate of ridges contacting the inner circumferential portion of the holding portion.

In the description of each embodiment, four first protrusions and four second protrusions are respectively arranged. However, the number of the first protrusions and the number of the second protrusions are not limited to four, and a plurality of first protrusions and a plurality of second protrusions may be provided.

In the case in which the number of the first protrusions and the number of the second protrusions are the same, it is more preferable that the first and second protrusions are alternately arranged in the circumferential direction, as in the embodiments described above.

However, the number of the first protrusions and the number of the second protrusions are not limited to the same number.

In the description of the first and second embodiments, the second protrusion protrudes from the outer circumferential portion of the sliding bearing and the inner circumferential portion of the holding portion. However, the second protrusion may protrude from both the outer circumferential portion of the sliding bearing and the inner circumferential portion of the holding portion at positions separated from each other in the circumferential direction.

In the description of the first and second embodiments, the locking portion 10B determines the inter-axis distance with the developing roller 11. However, the locking portion may be used to determine the inter-axis distance with the second rotation member appropriately arranged in parallel with the first rotation member.

In the description of the first and second embodiments, the locking portion 10B is locked to the outer circumferential portion of the ball bearing 12. However, a locking position of the locking portion is not limited to the outer circumferential portion of the bearing of the second rotation member. The locking portion may be locked anywhere on a support body by which the second rotation member is supported, as long as it is a portion capable of determining an inter-inter-axis distance with the second rotation member. For example, the locking portion may be locked to the developing case 8a.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A bearing device configured to support a first rotation member having a shaft at an end thereof, comprising:
   a sliding bearing comprising a main body and a plurality of first protrusions, the sliding bearing configured to fit to the shaft at an inner side of the plurality of first protrusions, the main body being formed in a cylindrical shape and having an inner diameter larger than an outer diameter of the shaft, and the plurality of first protrusions protruding inward in a radial direction from the main body and being separated from each other in a circumferential direction and configured to slide against the shaft;

a housing comprising a holding portion for supporting an outer side in the radial direction of the sliding bearing; and a plurality of second protrusions, separated from each other in a circumferential direction, protruding in the radial direction from at least one of an outer circumferential portion of the main body and an inner circumferential portion of the holding portion, the plurality of second protrusions configured to form a gap extending in the circumferential direction between the main body and the holding portion, wherein a linear expansion coefficient of material of the sliding bearing is lower than a linear expansion coefficient of material of the holding portion.

2. The bearing device according to claim 1, wherein arrangement positions of the plurality of first protrusions in the circumferential direction and arrangement positions of the plurality of second protrusions in the circumferential direction are shifted in the circumferential direction.

3. The bearing device according to claim 2, with the proviso that the plurality of second protrusions is not arranged on the main body on a back side of the plurality of first protrusions.

4. The bearing device according to claim 3, wherein the plurality of first protrusions is separated from each other at an interval wider than a length in the circumferential direction of any of the plurality of second protrusions.

5. The bearing device according to claim 3, wherein each of the plurality of first protrusions is arranged at a position corresponding to the middle in the circumferential direction of the second protrusions adjacent to each other among the plurality of second protrusions.

6. The bearing device according to claim 1, wherein a locking portion for determining an inter-axis distance with a central axis of the shaft protrudes at the outer circumferential portion of the main body.

7. The bearing device according to claim 6, wherein at least one of the plurality of first protrusions is arranged in the main body on the back side of the locking portion.

8. The bearing device according to claim 7, wherein the locking portion is configured to lock to a support body of a second rotation member rotatably supported, and to separate the second rotation member from the first rotation member by a certain inter-axis distance when locked.

9. An image forming apparatus, comprising:
a photoconductive drum comprising a shaft at an end thereof; and
a bearing device for supporting the photoconductive drum as a first rotation member, the bearing device comprises:
a sliding bearing comprising a main body and a plurality of first protrusions, the sliding bearing configured to fit to the shaft at an inner side of the plurality of first protrusions, the main body being formed in a cylindrical shape and having an inner diameter larger than an outer diameter of the shaft, and the plurality of first protrusions protruding inward in a radial direction from the main body and being separated from each other in a circumferential direction and configured to slide against the shaft;

a housing comprising a holding portion for supporting an outer side in the radial direction of the sliding bearing; and a plurality of second protrusions, separated from each other in a circumferential direction, protruding in the radial direction from at least one of an outer circumferential portion of the main body and an inner circumferential portion of the holding portion, the plurality of second protrusions configured to form a gap extending in the circumferential direction between the main body and the holding portion, wherein a linear expansion coefficient of material of the sliding bearing is lower than a linear expansion coefficient of material of the holding portion.

10. The image forming apparatus according to claim 9, wherein
arrangement positions of the plurality of first protrusions in the circumferential direction and arrangement positions of the plurality of second protrusions in the circumferential direction are shifted in the circumferential direction.

11. The image forming apparatus according to claim 10, with the proviso that the plurality of second protrusions is not arranged on the main body on a back side of the plurality of first protrusions.

12. The image forming apparatus according to claim 11, wherein
the plurality of first protrusions is separated from each other at an interval wider than a length in the circumferential direction of any of the plurality of second protrusions.

13. The image forming apparatus according to claim 11, wherein
each of the plurality of first protrusions is arranged at a position corresponding to the middle in the circumferential direction of the second protrusions adjacent to each other among the plurality of second protrusions.

14. The image forming apparatus according to claim 9, wherein
a locking portion for determining an inter-axis distance with a central axis of the shaft protrudes at the outer circumferential portion of the main body.

15. The image forming apparatus according to claim 14, wherein
at least one of the plurality of first protrusions is arranged in the main body on the back side of the locking portion.

16. The image forming apparatus according to claim 15, wherein
the locking portion is configured to lock to a support body of a second rotation member rotatably supported, and to separate the second rotation member from the first rotation member by a certain inter-axis distance when locked.

17. A method of maintaining substantially even rotation of a photoconductive drum in an image forming apparatus, comprising:
supporting a first rotation member having a shaft at an end thereof with a bearing device, the bearing device comprising:
a sliding bearing comprising a main body and a plurality of first protrusions, the sliding bearing configured to fit to the shaft at an inner side of the plurality of first protrusions, the main body being formed in a cylindrical shape and having an inner diameter larger than an outer diameter of the shaft, and the plurality of first protrusions protruding inward in a radial direction from the main body and being separated from each other in a circumferential direction and configured to slide against the shaft;

a housing comprising a holding portion for supporting an outer side in the radial direction of the sliding bearing; and a plurality of second protrusions, separated from each other in a circumferential direction, protruding in the radial direction from at least one of an outer circumferential portion of the main body and an inner circumferential portion of the holding portion, the plurality of second protrusions configured to form a gap extending in the circumferential direction between the main body and the holding portion, wherein a linear expansion coefficient of material of the sliding bearing is lower than a linear expansion coefficient of material of the holding portion.

18. The method according to claim 17, wherein
arrangement positions of the plurality of first protrusions in the circumferential direction and arrangement positions of the plurality of second protrusions in the circumferential direction are shifted in the circumferential direction.

* * * * *